(12) United States Patent
Gollamudi et al.

(10) Patent No.: US 7,787,530 B2
(45) Date of Patent: *Aug. 31, 2010

(54) MULTI-CHANNEL ADAPATIVE QUALITY CONTROL LOOP FOR LINK RATE ADAPTATION IN DATA PACKET COMMUNICATIONS

(75) Inventors: Sridhar Gollamudi, Morris Plains, NJ (US); Pantelis Monogioudis, Randolph, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 841 days.

This patent is subject to a terminal disclaimer.

(21) Appl. No.: 10/033,338

(22) Filed: Dec. 28, 2001

(65) Prior Publication Data

US 2003/0123598 A1 Jul. 3, 2003

(51) Int. Cl.
*H04B 3/46* (2006.01)
*H04B 17/00* (2006.01)

(52) U.S. Cl. ........................... 375/225; 375/219
(58) Field of Classification Search ............... 375/224, 375/225, 219, 377
See application file for complete search history.

(56) References Cited

U.S. PATENT DOCUMENTS 5,842,113 A * 11/1998 Nanda et al. ............... 455/69
6,639,934 B1 * 10/2003 Engstrom et al. ........... 375/130
6,985,453 B2 * 1/2006 Lundby et al. .............. 370/311
7,027,420 B2 * 4/2006 Hamalainen ................ 370/335
7,124,193 B1 * 10/2006 Leung et al. ................ 709/231
2002/0193133 A1 * 12/2002 Shibutani ................... 455/522
2003/0104831 A1 * 6/2003 Razavilar et al. ............ 455/522
2004/0202196 A1 * 10/2004 Sindhushayana et al. .... 370/465
2005/0054296 A1 * 3/2005 Chuang et al. ............. 455/63.1

* cited by examiner

*Primary Examiner*—Chieh M. Fan
*Assistant Examiner*—Freshteh N Aghdam
(74) *Attorney, Agent, or Firm*—Fay Sharpe LLP

(57) ABSTRACT

An adaptive quality control loop for link rate adaptation based on modulation and/or coding schemes (also referred to as "MCS levels") and one or more spreading codes that adaptively selects channel condition thresholds in real-time without measuring all the factors that affect selecting optimal channel condition thresholds. The adaptive quality control loop involves adjusting the channel condition thresholds with variable up and down steps based on target quality metrics along with measurements such as error detection results, relative frequencies of visiting each MCS level, and transmitted data rates, wherein the target quality metrics can be a block error rate or bit error rate target criterion. If the target quality metric is a block error rate target criterion, the variable step is determined using a desired MCS error rate based on MCS probabilities, MCS error rates and the block error rate target criterion. If the target quality metric is a bit error rate target criterion, the variable step is determined using a desired MCS error rate based on MCS probabilities, MCS error rates, average rate of bit errors, data rate, and the bit error rate target criterion.

19 Claims, 5 Drawing Sheets

MULTI-CHANNEL ADAPATIVE QUALITY CONTROL LOOP FOR LINK RATE ADAPTATION IN DATA PACKET COMMUNICATIONS

RELATED APPLICATION

Related subject matter is disclosed in the following applications filed concurrently and assigned to the same assignee hereof: U.S. patent application Ser. No. 10/033,335 entitled, "DELAY SENSITIVE ADAPATIVE QUALITY CONTROL LOOP FOR RATE ADAPTATION," inventors Sridhar Gollamudi and Pantelis Monogioudis; and U.S. patent application Ser. No. 10/033,339 entitled, "ADAPATIVE QUALITY CONTROL LOOP FOR RATE ADAPTATION IN DATA PACKET COMMUNICATION," inventors Sridhar Gollamudi and Pantelis Monogioudis.

FIELD OF THE INVENTION

The present invention relates generally to wireless data packet communications and, in particular, to performing quality control for wireless data packet communications.

BACKGROUND OF THE RELATED ART

In data packet communications over time-varying wireless communication channels, rate adaptation may be used to optimize data transmission. Rate adaptation is a technique that involves dynamically selecting a data rate for each packet of data to be transmitted based on a latest estimate of channel condition. The objective of rate adaptation is to select a data rate that would maximize data throughput without compromising data transmission quality.

In one rate adaptation proposal, selecting a data rate involves selecting a modulation and/or channel coding scheme, also referred to herein as "MCS level", and one or more of spreading codes, such as orthogonal spreading codes, to use in the transmission of the data packet at the selected MCS level. That is, the data rate, denoted as R(n,k), is a function of MCS level n and the number of spreading codes k used in a current transmission of a data packet at MCS level n. FIG. 5 depicts a chart 50 illustrating the relationship between data rate, MCS levels and spreading codes. Each MCS level n has associated a channel condition threshold $\theta(n)$ and one or more spreading codes, wherein the total number of spreading codes associated with a particular MCS level n is referred to herein as $c_n$ and $k \leq c_n$. Low MCS levels are associated with lower order modulation and/or stronger channel coding schemes, whereas high MCS levels are associated with higher order modulation and/or weaker channel coding schemes. As the MCS level n and the number of spreading codes k increase, the data rate R(n,k) increases.

The number of spreading codes k to be used in the current data packet transmission at the selected MCS level n is determined from a power offset given by a ratio of a channel quality metric to a channel condition threshold $\theta(n)$ associated with the selected MCS level n, as is known in the art. For example, $k = \lfloor 10^{power\ offset/10} \rfloor$, where the power offset can be signaled from the receiver to the transmitter. The MCS level n is selected based on estimates of channel conditions between a receiver and a transmitter. Channel conditions between a transmitter and a receiver are estimated at the receiver using any channel quality metric, such as carrier to interference (C/I) ratio, signal to interference plus noise ratio (SINR) or Shannon capacity. The estimate of channel condition is subsequently relayed, via a feed back channel, to the transmitter. The transmitter uses the estimate of channel condition to select an MCS level at which the transmitter is to transmit data packets to the receiver. In order to maximize data throughput, the MCS level n selected should be the MCS level n associated with the highest channel condition threshold $\theta(n)$ which the estimate of channel condition satisfies. A channel condition threshold is satisfied when the estimate of channel condition is greater or equal to the channel condition threshold. In good channel conditions, data transmission quality is less likely to be affected, thus a higher MCS level may be selected to achieve a higher data rate. By contrast, in poor channel conditions, data transmission quality is more likely to be affected and a lower MCS level should be selected to provide greater protection for the data packet being transmitted. The number of spreading codes and the selected MCS level is communicated to the receiver by the transmitter. Based on the number of spreading codes and the selected MCS level, the receiver would know which spreading codes and MCS level to use in decoding an associated transmitted data packet from the transmitter.

The choice of channel condition thresholds $\theta(n)$ can significantly affect link performance criteria, such as average throughput, packet and bit error rates and average number of retransmissions with ARQ, HARQ or similar error correction schemes. Optimal choice of channel condition thresholds $\theta(n)$ are based on a complicated function of several factors such as metric estimation accuracy, Doppler frequency of the channel, feedback delay, fading statistics and SINR at the receiver, channel profile, choice of MCS levels, and transmitter and receiver design. Most of these factors are, however, time varying which would, in turn, cause the optimal channel condition thresholds to be time varying. Thus, it would be desirable for channel condition thresholds $\theta(n)$ that are adaptive as the factors vary over time. One way of implementing adaptive channel condition thresholds $\theta(n)$ involves measuring the above mentioned factors in real-time and calculating optimized channel condition thresholds $\theta(n)$ based on those factors. However, due to the large number of factors affecting the optimal channel condition thresholds $\theta(n)$, it would be impractical to implement channel condition thresholds $\theta(n)$ in this manner. Accordingly, there exists a need for adaptively selecting channel condition thresholds for rate adaptation using MCS levels and one or more spreading codes in real-time without measuring all the factors that affect optimal channel condition thresholds.

SUMMARY OF THE INVENTION

The present invention is an adaptive quality control loop for link rate adaptation based on modulation and/or coding schemes (also referred to as "MCS levels") and one or more spreading codes that adaptively selects channel condition thresholds in real-time without measuring all the factors that affect selecting optimal channel condition thresholds. The adaptive quality control loop involves adjusting the channel condition thresholds with variable up and down steps based on target quality metrics along with measurements such as error detection results, relative frequencies of visiting each MCS level, and transmitted data rates, wherein the target quality metrics can be a block error rate or bit error rate target criterion. If the target quality metric is a block error rate target criterion, the variable step is determined using a desired MCS error rate based on MCS probabilities, MCS error rates and the block error rate target criterion. If the target quality metric is a bit error rate target criterion, the variable step is determined using a desired MCS error rate based on MCS probabilities, MCS error rates, average rate of bit errors, data rate, and the bit error rate target criterion.

BRIEF DESCRIPTION OF THE DRAWINGS

The features, aspects, and advantages of the present invention will become better understood with regard to the following description, appended claims, and accompanying drawings where:

DETAILED DESCRIPTION

The present invention is an adaptive quality control loop for link rate adaptation based on modulation and/or coding schemes (also referred to as "MCS levels") and one or more spreading codes that adaptively selects channel condition thresholds in real-time without measuring all the factors that affect selecting worst channel condition thresholds. The adaptive quality control loop involves adjusting the channel condition thresholds with variable up and down steps based on target quality metrics along with measurements such as error detection results, relative frequencies of visiting each MCS level, and transmitted data rates, wherein the target quality metrics can be a block error rate or bit error rate target criterion.

Figure 1:
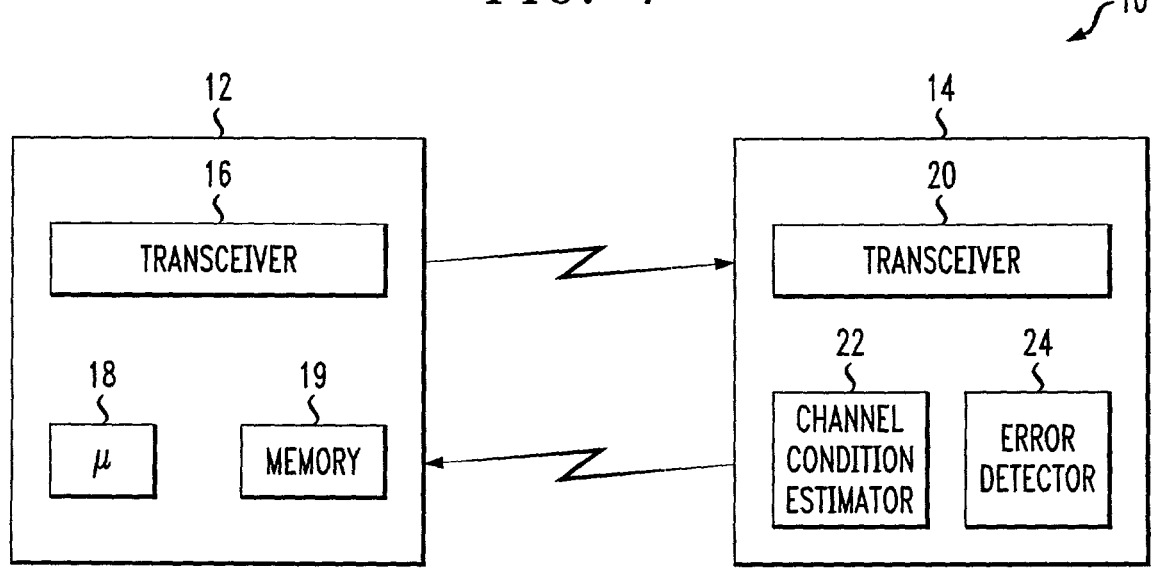
FIG. 1 depicts a wireless communication system used in accordance with the present invention.

FIG. 1 depicts a wireless communication system 10 used in accordance with the present invention. Wireless communication system 10 incorporates a multiplexing scheme, such as code division multiple access (CDMA), time division multiple access (TDMA), etc. Wireless communication system 10 comprises a transmitter 12 and a receiver 14. Transmitter 12 includes a transceiver 16 for transmitting and receiving data over an air interface, and a processor 18 with associated memory 19 for determining a particular MCS level at which to transmit data packet. Receiver 14 includes a transceiver 20 for receiving and transmitting data over an air interface, a channel condition estimator 22 for estimating channel conditions between transmitter 12 and receiver 14, and an error detector 24 for detecting error in received data packet. Note that processor 18 and memory 19 may, alternately, be parts of receiver 14 or of an independent entity in communication with both receiver 14 and transmitter 12. Thus, the present invention should not be limited to a wireless communication system in which processor 18 and memory 19 are parts of transmitter 12.

Figure 2:
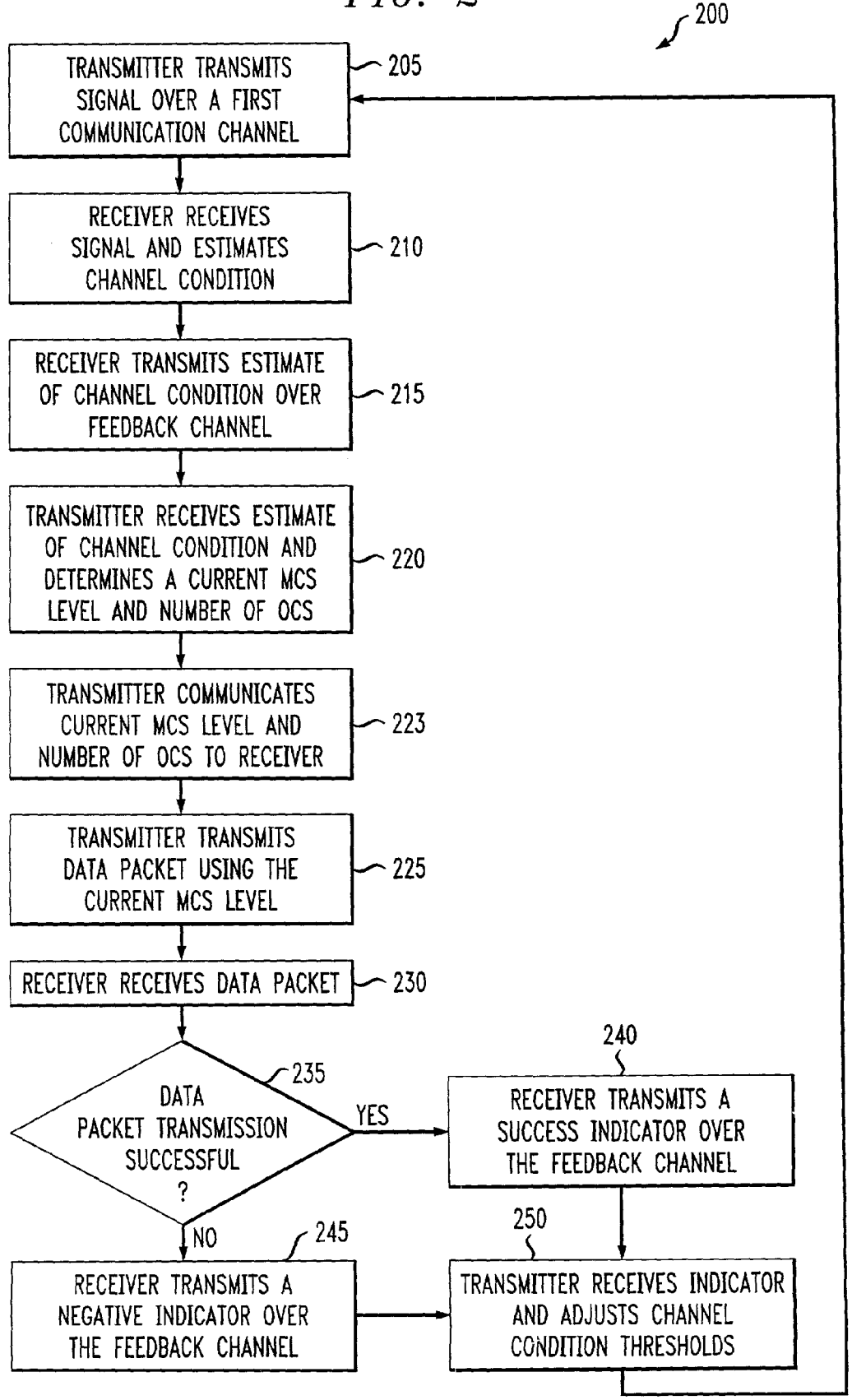
FIG. 2 depicts a flowchart illustrative of an adaptive quality control loop in accordance with one embodiment of the present invention.

FIG. 2 depicts a flowchart 200 illustrative of an adaptive quality control loop in accordance with one embodiment of the present invention. In step 205, transmitter 12 transmits a signal, wherein the signal may be any signal which channel condition estimator 22 can use to estimate channel conditions between transmitter 12 and receiver 14, such as a pilot signal or beacon frequency signal. In step 210, receiver 14 receives the signal and channel condition estimator 22 estimates the channel condition between transmitter 12 and receiver 14 using the received signal. Channel conditions can be estimated using any channel quality metric, such as carrier to interference (C/I) ratio, signal to interference plus noise ratio (SINR) or Shannon capacity. The estimate of channel condition is transmitted by receiver 14, in step 215, over a feedback channel to transmitter 12.

In step 220, transmitter 12 receives the estimate of channel condition and processor 18 uses such estimate to determine a current MCS level m and a number of spreading codes k for transmitting a data packet to receiver 14 at the current MCS level m. The current MCS level m may be selected from a look-up table. In the look-up table, each MCS level n has associated a channel condition threshold $\theta(n)$ and one or more spreading codes, wherein the total number of spreading codes associated with a particular MCS level n is referred to herein as $c_n$ and $k \leq c_n$. Low MCS levels are associated with strong modulation and/or channel coding schemes, whereas high MCS levels are associated with weak modulation and/or channel coding schemes. As the MCS level n and the number of spreading codes k increase, the data rate R(n,k) increases. Channel condition threshold $\theta(n)$ may, in one embodiment, be initially determined based on a complex function of several factors such as metric estimation accuracy, Doppler frequency of the channel, feedback delay, fading statistics and SINR at the receiver, channel profile, choice of MCS levels, and transmitter and receiver design, as is well-known in the art.

The MCS level n is selected based on the estimate of channel condition. In order to maximize data throughput, the current MCS level m selected should be the MCS level n associated with the highest channel condition threshold $\theta(n)$ which the estimate of channel condition satisfies. A channel condition threshold is satisfied when the estimate of channel condition is greater or equal to the channel condition threshold. In good channel conditions, data transmission quality is less likely to be affected, thus a higher MCS level may be selected to achieve a higher data rate. By contrast, in poor channel conditions, data transmission quality is more likely to be affected and a lower MCS level should be selected to provide greater protection for the data packet being transmitted.

The number of spreading codes k to be used in the current data packet transmission at the current MCS level m is determined from a power offset given by a ratio of a channel quality metric to channel condition threshold $\theta(m)$ associated with the current MCS level m. In step 223, transmitter 12 communicates the current MCS level m and the determined number of spreading codes k to receiver 14. Based on the number of spreading codes, receiver 14 will know which spreading codes to use in decoding an associated data packet. Alternately, transmitter 12 communicates identities of the spreading codes to be used in the transmission of the associated data packet. Note that in another embodiment, the current MCS level m and the number of spreading codes k is determined at receiver 14 and communicated to transmitter 12.

In step 225, transmitter 12 transmits data packet to receiver 14 using the current MCS level m and k number of spreading codes. In step 230, receiver 14 receives the data packet. In step 235, error detector 24 determines whether the data packet transmission was successful, i.e., data packet could be successfully decoded at receiver 14 to obtain an error detection result. In one embodiment, error detector 24 performs a cyclical redundancy check (CRC) on the data packet, as is well-known in the art. If the CRC is successful, then error detector 24 determines that the error detection result is positive, i.e., data packet transmission was successful. If the CRC fails, then error detector 24 determines that the error detection result is negative, i.e., data packet transmission failed.

If error detector 24 detects a successful data packet transmission, then receiver 14 transmits a success indicator over the feedback channel (or some other communication channel) to transmitter 12 indicating a positive error detection result, in step 240. If error detector 24 detects a failed data packet transmission, then receiver 14 transmits a failure indicator over the feedback channel (or some other communication channel) to transmitter 12 indicating a negative error detection result, in step 245.

From step 240 or 245, flowchart 200 proceeds to step 250 where processor 18 updates channel condition threshold θ(m) and, perhaps, channel condition thresholds θ(m) in the table in memory 19 before returning to step 205. Note that a re-transmission of a data packet may occur at a MCS level different from the preceding transmission of the same data packet if the channel condition changes.

Updating channel condition threshold θ(m) (or other channel condition thresholds θ(n)) involves the following. Generally, if a success indicator is received, the channel condition threshold θ(m) associated with the current MCS level m is decreased a down step $\Delta_{Down}(m)$, i.e., the channel condition threshold θ(m) is lowered. By contrast, if a failure indicator is received, the channel condition threshold θ(m) associated with the current MCS level m is increased an up step $\Delta_{Up}(m)$, i.e., the channel condition threshold θ(m) is increased. Other embodiments for updating channel condition thresholds θ(m) (or other channel condition thresholds θ(n)) are described later herein.

In addition to adjusting the channel condition threshold θ(m) of the current MCS level m, the channel condition thresholds θ(n) of other MCS levels n may also be adjusted, as will be described herein. Note that, when increasing or decreasing channel condition thresholds θ(n), the channel condition thresholds being increased or decreased should not be increased above or decreased below their adjacent channel condition thresholds. That is, for example, channel condition threshold θ(2) should not be decreased below channel condition threshold θ(1) nor increased above channel condition threshold θ(3).

Many variations of the up step $\Delta_{Up}$ and down step $\Delta_{Down}$ may exist for the present invention. Some of these variations will be described herein. This should not, however, be construed to be inclusive of all possible variations of up steps $\Delta_{Up}$ and down steps $\Delta_{Down}$ for the present invention. The down step $\Delta_{Down}(m)$ for channel condition threshold θ(m) may be equal to or different from the up step $\Delta_{Up}(m)$ for the same channel condition threshold θ(m). The up step $\Delta_{Up}(n)$ and down step $\Delta_{Down}$ may be the same, different or some combination thereof across all channel condition thresholds θ(n). For example, the up step $\Delta_{Up}(1)$ for channel condition threshold θ(1) may be the same or different than the up step $\Delta_{Up}(2)$ for channel condition threshold θ(2).

The up steps $\Delta_{Up}(n)$ and down steps $\Delta_{Down}(n)$ may be of fixed or variable sizes for a particular or all channel condition thresholds θ(n). In one embodiment, channel condition thresholds θ(n) are adaptively adjusted using variable up steps $\Delta_{Up}(n)$ and down steps $\Delta_{Down}(n)$. The variable up steps $\Delta_{Up}(n)$ and down steps $\Delta_{Down}(n)$ may be determined in a variety of manners. Two manners are proposed herein. The first manner of determining variable up steps $\Delta_{Up}(n)$ and down steps $\Delta_{Down}(n)$ is based on block error rate (BLER) $P_{BLER}$, which is a rate of data packet error averaged over all MCS levels. The second manner is based on bit error rate (BER) $P_{BER}$, which is a rate of bit error averaged over all MCS levels.

Figure 3:
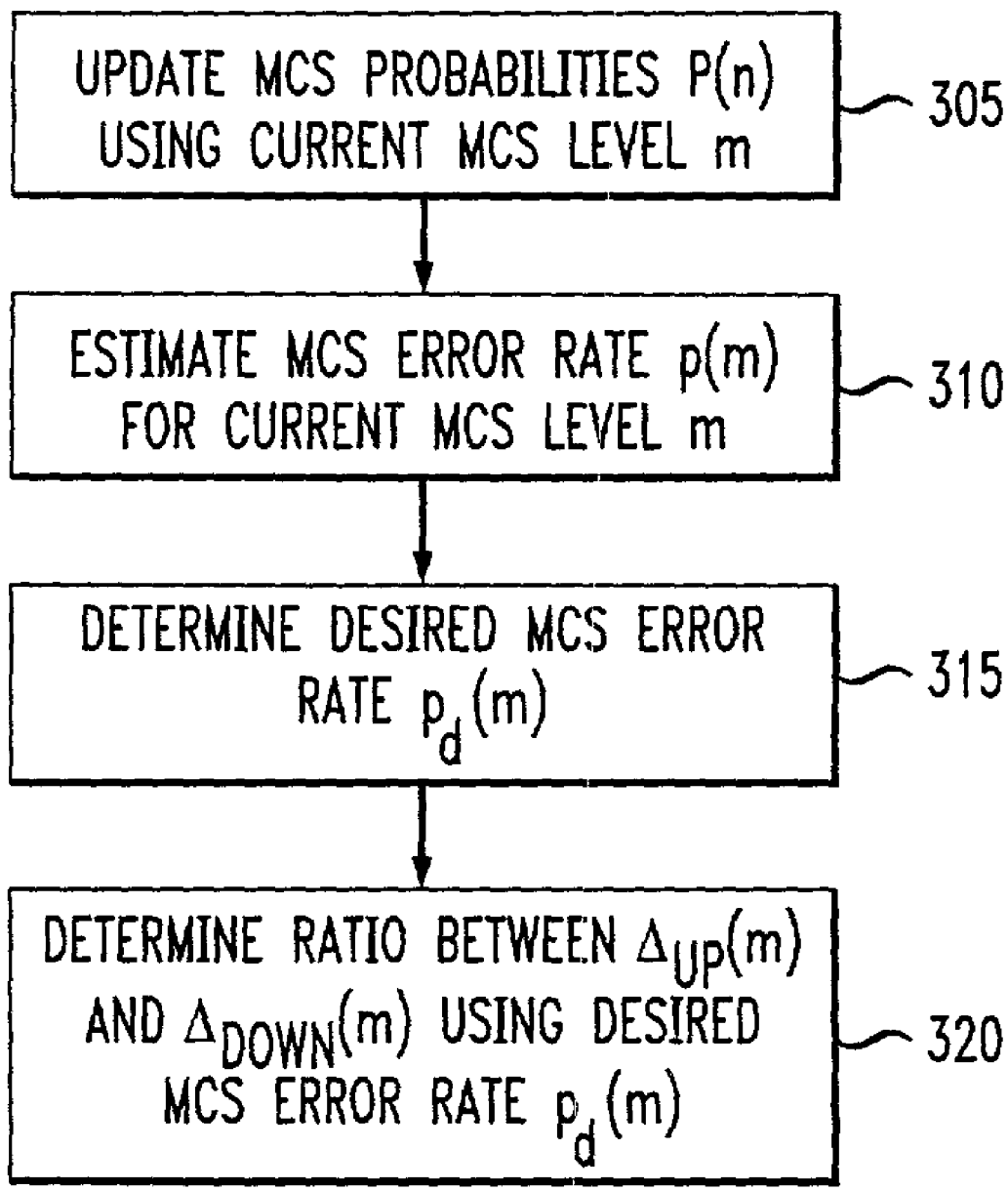
FIG. 3 depicts a flowchart illustrative of one embodiment of determining variable up steps $\Delta_{Up}(n)$ and down steps $\Delta_{Down}(n)$ using modulation and/or coding schemes (MCS) probabilities P(n), MCS error rate p(n) and a block error rate (BLER) target criterion.

The first manner is illustrated in FIG. 3, which depicts a flowchart 300 for determining variable up steps $\Delta_{Up}(n)$ and down steps $\Delta_{Down}(n)$ using MCS probabilities P(n), MCS error rates p(n), and a BLER target criterion. The MCS probability P(n) is the probability that a data packet is transmitted with MCS level n to a particular receiver. In other words, it is the fraction of times that MCS level n is selected for data packet transmission to a particular receiver. The MCS error rate p(n) is the probability that a data packet transmitted using MCS level n would not be received successfully by a particular receiver In step 305, MCS probabilities P(n) for MCS levels n for receiver 14 are updated using the current MCS level m. In one embodiment, MCS probabilities P(n) are estimated using simple averaging. For example, suppose there are three MCS levels 1, 2 and 3, and MCS levels 1, 2 and 3 were chosen 3, 4 and 2 times, respectively, prior to choosing the current MCS level m. The MCS probabilities prior to the selection of the current MCS level m would then be estimated to be P(1)=0.33, P(2)=0.44 and P(3)=0.22. If the current MCS level m is 1, then the MCS probabilities P(n) would be updated such that P(1)=0.40, P(2)=0.40 and P(3)=0.20.

In another embodiment, MCS probabilities P(n) are estimated using exponential averaging. Specifically, the MCS probabilities P(n) are estimated using equation (1), $$P(n) = \begin{cases} \lambda P'(n) + (1-\lambda) & \text{if } n = m \\ \lambda P'(n) & \text{otherwise} \end{cases} \quad \text{equation (1)}$$

where λ is a forgetting factor that is between 0 and 1 (usually closer to 1) and prime ' indicates the previous value of the associated parameter prior to update. The forgetting factor is a factor used to compute an average of a sequence of observations when the average itself is a slowly varying quantity, as is well-known in the art. The MCS probabilities P(n) may be estimated using other averaging schemes, such as computing an average over a sliding window. Thus, the present invention should not be limited to the above described techniques for estimating MCS probabilities P(n).

In step 310, MCS error rate p(m) for the current MCS level m is estimated. In one embodiment, MCS error rate P(m) is estimated using simple averaging. For example, if 50% of the data packet sent with MCS level 3 have CRC failures, then the MCS error rate for level 3 is p(3)=0.5. In another embodiment, MCS error rate p(m) is estimated using exponential averaging. Specifically, MCS error rate p(m) is estimated using equation (2).

$$p(m) = \begin{cases} \lambda p'(m) + (1-\lambda) & \text{if } CRC \text{ fails} \\ \lambda p'(m) & \text{if } CRC \text{ succeeds} \end{cases} \quad \text{equation (2)}$$

The MCS error rate p(m) may be estimated using other averaging schemes, such as computing an average over a sliding window. Thus, the present invention should not be limited to the above described techniques for estimating the MCS error rate p(m). Note that, in step 310, only the MCS error rate p(m) for the current MCS level m is estimated, and not MCS error rate p(n) for all MCS levels n. The reason for not updating the MCS error rate p(n) for other MCS levels n is because no new information is available at this time for the other MCS levels n. It should be understood that estimates for MCS error rates p(n) of MCS levels n other than MCS level m also exist.

In step 315, a desired MCS error rate p(m), denoted hereinafter as $p_d(m)$, is computed for current MCS level m. The desired MCS error rate $p_d(m)$ is based on a BLER target criterion, referred to herein as $P_{BLER}^{Target}$, which is a target or desired $P_{BLER}$ averaged over all MCS levels n. Note that $P_{BLER}$ can generally be expressed using equation (3), $$P_{BLER} = \sum_{n=1}^{M} p(n)P(n) \quad \text{equation (3)}$$

where M is the total number of MCS levels.

The desired MCS error rate $p_d(m)$ is determined using equation (4).

$$p_d(m) = \frac{1}{P(m)}\left[P_{BLER}^{Target} - \sum_{n=1,n\neq m}^{M} p(n)P(n)\right] \quad \text{equation (4)}$$

In step 320, the desired MCS error rate $p_d(m)$ is used to determine the sizes or a ratio between the sizes of the down step $\Delta_{Down}(m)$ and up step $\Delta_{Up}(m)$ for the current MCS level m. In one embodiment, the up-to-down step ratio for the current MCS level m is set to satisfy equation (5).

$$\frac{\Delta_{Up}(m)}{\Delta_{Down}(m)} = \frac{1-p_d(m)}{p_d(m)} \quad \text{equation (5)}$$

Alternatively, the sizes for the up step $\Delta_{Up}$ and down step $\Delta_{Down}$ may be determined using equations (6) and (7), respectively:

$$\Delta_{Up}(m) = \mu(1-p_d(m)) \quad \text{equation (6)}$$

$$\Delta_{Down}(m) = \mu p_d(m) \quad \text{equation (7)}$$

where $\mu$ is a positive constant.

The up and down steps $\Delta_{Up}$ and $\Delta_{Down}$ are used accordingly in step 250 to adjust the corresponding channel condition threshold $\theta(m)$. That is, if a success indicator is received, the channel condition threshold $\theta(m)$ is decreased a down step $\Delta_{Down}(m)$. If a failure indicator is received, the channel condition threshold $\theta(m)$ associated with the current MCS level m is increased an up step $\Delta_{Up}(m)$.

Figure 4:
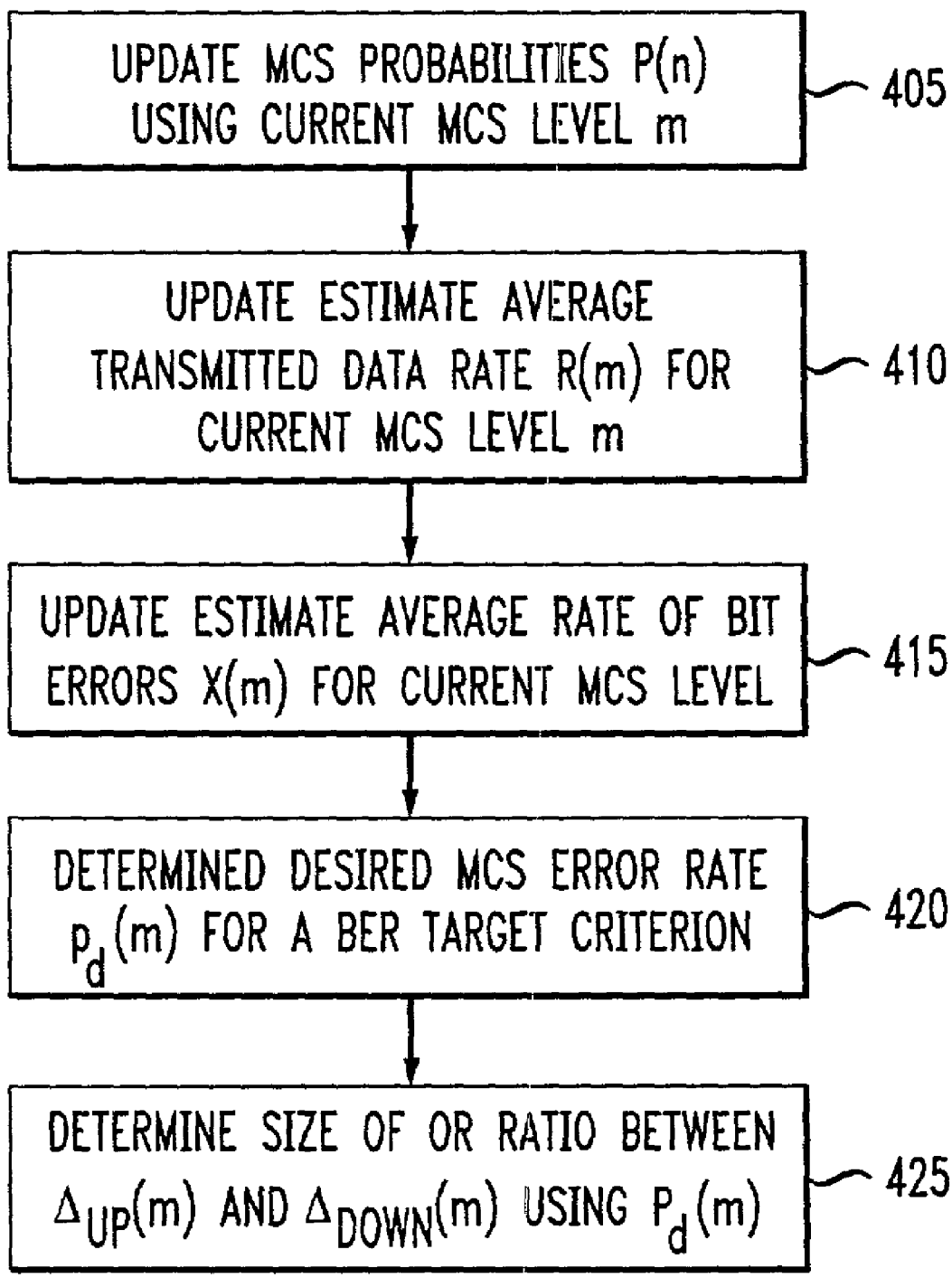
FIG. 4 depicts a flowchart illustrative of one embodiment of determining variable up steps $\Delta_{Up}(n)$ and down steps $\Delta_{Down}(n)$ using modulation and/or coding schemes (MCS) probabilities P(n), MCS error rate p(n) and a bit error rate (BER) target criterion.
Figure 5:
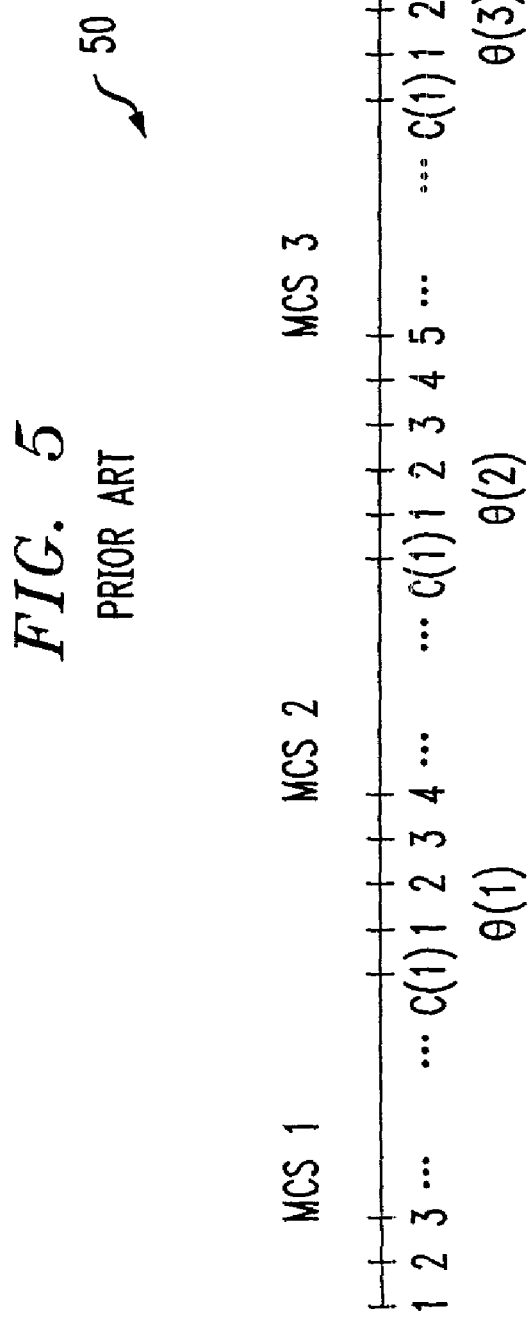
FIG. 5 depicts a chart illustrating relationships between data rate, MCS levels and spreading codes.

The second manner of determining variable up steps $\Delta_{Up}(n)$ and down steps $\Delta_{Down}(n)$ is illustrated in FIG. 4, which depicts a flowchart 400 that uses MCS probabilities P(n), MCS error rates p(n), and a BER target criterion to determine the variable up steps $\Delta_{Up}(n)$ and down steps $\Delta_{Down}(n)$. In step 405, MCS probabilities P(n) for receiver 14 are updated using the current MCS level m in a manner similar to that described for step 305. In step 410, an estimate of an average transmitted data rate at the current MCS level m, denoted herein as R(m), is updated. The average transmitted data rate for current MCS level m is updated, in one embodiment, using equation (8), $$R(m) = \lambda R'(m) + (1-\lambda)R(m,k) \quad \text{equation (8)}$$

where R(m,k) is the data rate corresponding to k number of spreading codes used at the current MCS level m to transmit the current data packet. Note that estimates of average transmitted data rates at MCS levels n≠m are not updated.

In step 415, an estimate of average rate of bit errors, denoted X(m), is updated for the current MCS level m using equation (9), $$X(m) = \lambda X'(m) + (1-\lambda)X(m,k)B_e \quad \text{equation (9)}$$

where $B_e$ is 0 if CRC succeeds and 1 if CRC fails. In step 420, a desired MCS error rate $p_d(m)$ is computed for current MCS level m. The desired MCS error rate $p_d(m)$ is based on a BER target criterion, referred to herein as $PB_{BER}^{Target}$, which is a target or desired $P_{BER}$ averaged over all MCS levels n. Note that $P_{BER}$ can generally be expressed using equation (10), $$P_{BER} = \frac{\sum_{n=1}^{M} X(n)P(n)}{\sum_{n=1}^{M} R(n)P(n)} \quad \text{equation (10)}$$

where R(n) is the average transmitted data rate for MCS level n. The desired MCS error rate $p_d(m)$ is determined using equation (11).

$$p_d(m) = \frac{1}{R(m)P(m)}\left[P_{BER}^{Target}\sum_{n=1}^{M} R(n)P(n) - \sum_{n=1,n\neq m}^{M} X(n)P(n)\right] \quad \text{equation (11)}$$

In step 425, the desired MCS error rate $p_d(m)$ is used to determine the sizes or a ratio between the sizes of the down step down step $\Delta_{Down}(m)$ and up step $\Delta_{Up}(m)$ for the current MCS level m in a manner similar to step 320.

The up step $\Delta_{Up}(m)$ and down step $\Delta_{Down}(m)$ are used accordingly in step 250 to adjust the corresponding channel condition threshold $\theta(m)$. In one embodiment, when a target BER is used, the channel condition threshold $\theta(m)$ for the current MCS level m is adjusted in step 250 according to equation (12), $$\theta(m) = \begin{cases} \theta'(m) + \delta(m)R(m,k)\Delta_{Up}(m) & \text{if } CRC \text{ fails} \\ \theta'(m) - \delta(m)R(m,k)\Delta_{Down}(m) & \text{if } CRC \text{ succeeds} \end{cases} \quad \text{equation (12)}$$

where $\delta(m)$ is a small fixed positive constant for MCS level m.

In one embodiment, only the channel condition threshold $\theta(m)$ for the current MCS level m is adjusted in step 250. In another embodiment, one or more other channel condition thresholds $\theta(n)$ for MCS levels n other than MCS level m are also adjusted. For example, the other channel condition thresholds $\theta(n)$ being adjusted are adjusted the same amount as channel condition threshold $\theta(m)$ such that the relative distance between the channel condition thresholds $\theta(n)$ being adjusted, including channel condition threshold $\theta(m)$, remain fixed. Alternately, the other channel condition thresholds $\theta(n)$ are adjusted using up steps $\Delta_{Up}(n)$ and down steps $\Delta_{Down}(n)$ determined separately from up step $\Delta_{Up}(m)$ and down step $\Delta_{Down}(m)$.

In one embodiment of determining the sizes of the variable up steps $\Delta_{Up}(n)$ and down steps $\Delta_{Down}(n)$ where the relative positions of the channel condition thresholds are unchanged, i.e., if at every update instant the same up and down steps are applied to all thresholds, the variable up steps $\Delta_{Up}(n)$ and down steps $\Delta_{Down}(n)$ are determined based a constant target BER $P_{BER}^{Target}$ and data rates R(n) using equations (13) and (14).

$$\Delta_{Up}(n)=\mu R(n)(1-P_{BER}^{Target}) \quad \text{equation (13)}$$

$$\Delta_{Down}(n)=\mu R(n)P_{BER}^{Target} \quad \text{equation (14)}$$

Note that the target BLER $P_{BER}^{Target}$ may be used instead of the target BER $P_{BER}^{Target}$ to determine the sizes for the up step $\Delta_{Up}(n)$ and down step $\Delta_{Down}(n)$ in step 320 of flowchart 300.

The present invention has been described herein with reference to certain embodiment. This should not be construed to limit the present invention to the embodiments described herein. For example, the flowcharts depict an exact sequence of steps for use in the present invention. The sequence of steps may vary such as, in another embodiment of flowchart 200, steps 205, 210, 215 and 220 may be executed as a part of steps 225, 230-235, 240-245 and 250, respectively. Therefore, the spirit and scope of the present invention should not be limited to the description of the embodiments contained herein.

We claim:

1. An adaptive quality control loop for a rate adaptation based on modulation and coding scheme (MCS) levels and multiple spreading codes, comprising:
    adjusting a first channel condition threshold in a transmitter based on a first error detection result from a receiver for a first data packet transmission between the transmitter and receiver using a first variable size step for the adjusting, wherein the first channel condition threshold is based on a first modulation and coding scheme (MCS) level used in the first data packet transmission, and the first variable size step is determined by the transmitter using a desired MCS error rate for the first MCS level, comprising:
        determining the first variable size step using a block or bit error rate target criterion and a first data rate associated with the first MCS level;
    wherein the desired MCS error rate for the first MCS level is based on a block error rate target criterion, MCS probabilities for the first MCS level and for other MCS levels, and MCS error rates for the other MCS levels.

2. The adaptive quality control loop of claim 1 comprising the additional steps of:
    adjusting a second channel condition threshold based on a second error detection result for a second data packet transmission using a second variable size step, wherein the second channel condition threshold is associated with a second MCS level used in the second data packet transmission.

3. The adaptive quality control loop of claim 1 comprising the additional steps of:
    selecting a second MCS level based on an estimate of channel condition between the receiver and transmitter using a table having the adjusted first channel condition threshold.

4. The adaptive quality control loop of claim 3 comprising the additional steps of:
    transmitting a second data packet using the second MCS level.

5. The adaptive quality control loop of claim 1, wherein the step of adjusting the first channel condition threshold comprises the step of:
    determining the first variable size step using the first error detection result.

6. The adaptive quality control loop of claim 1 comprising the additional steps of:
    adjusting a second channel condition threshold by a second amount equal to a first amount at which the first channel condition threshold was adjusted.

7. The adaptive quality control loop of claim 1, wherein the desired MCS error rate for the first MCS level is based on a block error rate target criterion.

8. An adaptive quality control loop for a rate adaptation based on modulation and coding scheme (MCS) levels and multiple spreading codes, the adaptive quality control loop comprising in the step of:
    adjusting a first channel condition threshold based on a first error detection result for a first data packet transmission between a transmitter and a receiver using a first variable size step, wherein the first channel condition threshold is based on a first modulation and coding scheme (MCS) level used in the first data packet transmission, and the first variable size step is determined using a desired MCS error rate for the first MCS level;
    wherein determining the first variable size step comprises:
    updating MCS probabilities for all MCS levels using the first error detection result;
    updating an MCS error rate for the first MCS level; and
    determining a ratio between a first variable size up step and a first variable size down step associated with the first variable size step using the updated MCS probabilities, MCS error rate and a target criterion.

9. The adaptive quality control loop of claim 8, wherein the desired MCS error rate is determined by solving $$p_d(m) = \frac{1}{P(m)} \left[ P_{BLER}^{Target} - \sum_{n=1, n \neq m}^{M} p(n)P(n) \right]$$

where $p_d(m)$ is the desired MCS error rate, P(m) is the MCS probability for the first MCS level, $P_{BLER}^{Target}$ is block error rate target criterion, p(n) is the MCS error rates for a particular MCS level n, and P(n) is the MCS probability for a particular MCS level n.

10. The adaptive quality control loop of claim 8, wherein the step of adjusting the first channel condition threshold comprises the step of:
    determining the first variable size step using a block error rate target criterion and a first data rate associated with the first MCS level.

11. The adaptive quality control loop of claim 8, wherein the step of adjusting the first channel condition threshold comprises the step of:
    determining the first variable size step using a bit error rate target criterion and a first data rate associated with the first MCS level.

12. An adaptive quality control loop for a rate adaptation based on modulation and coding scheme (MCS) levels and multiple spreading codes, the adaptive quality control loop comprising in the step of:
    adjusting a first channel condition threshold based on a first error detection result for a first data packet transmission between a transmitter and a receiver using a first variable size step, wherein the first channel condition threshold is based on a first modulation and coding scheme (MCS) level used in the first data packet transmission, and the first variable size step is determined using a desired MCS error rate for the first MCS level;
    wherein the first variable size step is associated with a first variable size up step and a first variable down step, the first channel condition threshold being increased an amount based on the first variable size up step if the first error detection result indicates the first data transmission was unsuccessful, the first channel condition threshold being decreased an amount based on the first variable size down step if the first error detection result indicates the first data transmission was successful.

13. The adaptive quality control loop of claim 12, wherein for a block error rate target criterion, the first channel condition is adjusted an amount equal to the first variable size up step if the first error detection result indicates the first data transmission was unsuccessful, and the first channel condition is adjusted an amount equal to the first variable size down step if the first error detection result indicates the first data transmission was successful.

14. The adaptive quality control loop of claim 12, wherein for a bit error rate target criterion, the first channel condition is adjusted an amount based on the first variable size up step and a data rate associated with the first data transmission if the first error detection result indicates the first data transmission was unsuccessful, and the first channel condition is adjusted an amount based on the first variable size down step and a data rate associated with the first data transmission if the first error detection result indicates the first data transmission was successful.

15. The adaptive quality control loop of claim 14, wherein the first channel condition is adjusted an amount equal to $\delta(m)R(m,k)\Delta_{Up}(m)$ if the first error detection result indicates the first data transmission was unsuccessful, the first channel condition is adjusted an amount equal to $\delta(m)R(m,k)\Delta_{Down}(m)$ if the first error detection result indicates the first data transmission was successful, and R(m,k) is the data rate associated with the first data transmission, $\Delta_{Up}(m)$ is the first variable size up step for the first MCS level, $\Delta_{Down}(m)$ is the first variable size down step for the first MCS level and $\Delta(m)$ is a small fixed positive constant for the first MCS level.

16. The adaptive quality control loop of claim 12, wherein a ratio between the first variable up step and first variable down step are based on a desired MCS error rate for the first MCS level.

17. An adaptive quality control loop for a rate adaptation based on modulation and coding scheme (MCS) levels and multiple spreading codes, comprising:

adjusting a first channel condition threshold in a transmitter based on a first error detection result from a receiver for a first data packet transmission between the transmitter and receiver using a first variable size step for the adjusting, wherein the first channel condition threshold is based on a first modulation and coding scheme (MCS) level used in the first data packet transmission, and the first variable size step is determined by the transmitter using a desired MCS error rate for the first MCS level, comprising;

determining the first variable size step using a block or bit error rate target criterion and a first data rate associated with the first MCS level;

wherein the desired MCS error rate for the first MCS level is based on a bit error rate target criterion, MCS probabilities for the first MCS level and for other MCS levels, average transmitted data rates for the first MCS level and for the other MCS levels, average rate of bit errors for the other MCS levels, and MCS error rates for the other MCS levels.

18. The adaptive quality control loop of claim 17, wherein the desired MCS error rate for the first MCS level is based on a bit error rate target criterion.

19. The adaptive quality control loop of claim 17, wherein the desired MCS error rate is determined by solving $$p_d(m) = \frac{1}{R(m)P(m)}\left[P_{BER}^{Target}\sum_{n=1}^{M} R(n)P(n) - \sum_{n=1,n\neq m}^{M} X(n)P(n)\right]$$

where $p_d(m)$ is the desired MCS error rate, P(m) is the MCS probability for the first MCS level, $P_{BER}^{Target}$ is the bit error rate target criterion, X(n) is the average rate of bit errors for a particular MCS level n, R(n) is the average transmitted data rate for a particular MCS level n, R(m) is the average transmitted data rate for the first MCS level, and P(n) is the MCS probability for a particular MCS level n.

* * * * *